United States Patent
Ichinose

(10) Patent No.: US 7,091,840 B2
(45) Date of Patent: Aug. 15, 2006

(54) TIRE PRESSURE DETECTION SYSTEM AND A WHEEL USED THEREIN

(75) Inventor: Hidemi Ichinose, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 93 days.

(21) Appl. No.: 10/752,038

(22) Filed: Jan. 7, 2004

(65) Prior Publication Data

US 2004/0155764 A1   Aug. 12, 2004

(30) Foreign Application Priority Data

Feb. 10, 2003   (JP) .............................. 2003-032212

(51) Int. Cl.
*B60C 23/00* (2006.01)

(52) U.S. Cl. .................. 340/447; 340/521; 340/693.9; 152/152.1; 73/146.5

(58) Field of Classification Search ................ 340/447, 340/445, 442, 693.1, 5.61, 5.1
See application file for complete search history.

(56) References Cited

U.S. PATENT DOCUMENTS

| | | | |
|---|---|---|---|
| 3,999,431 A * | 12/1976 | Makarainen | 73/146.5 |
| 4,067,235 A * | 1/1978 | Markland et al. | 73/146.5 |
| 4,384,482 A * | 5/1983 | Snyder | 73/146.5 |
| 5,289,160 A | 2/1994 | Fiorletta | 340/447 |
| 5,541,574 A * | 7/1996 | Lowe et al. | 340/447 |
| 5,562,787 A | 10/1996 | Koch et al. | 156/64 |
| 6,087,930 A | 7/2000 | Kulka et al. | |
| 6,232,875 B1 * | 5/2001 | DeZorzi | 340/442 |
| 6,292,095 B1 | 9/2001 | Fuller et al. | 340/442 |
| 6,597,284 B1 * | 7/2003 | Juzswik | 340/442 |
| 2002/0124637 A1 * | 9/2002 | Saheki et al. | 73/146 |
| 2005/0072224 A1 * | 4/2005 | Huang | 73/146.3 |

FOREIGN PATENT DOCUMENTS

| | | | |
|---|---|---|---|
| EP | 0 494 763 A1 | | 7/1992 |
| FR | 2 807 362 | | 10/2001 |
| JP | 09-005178 | * | 1/1997 |
| WO | WO 02/47924 A1 | | 6/2002 |
| WO | WO 03/042949 A1 | | 5/2003 |

* cited by examiner

*Primary Examiner*—Benjamin C. Lee
(74) *Attorney, Agent, or Firm*—Armstrong, Kratz, Quintos, Hanson & Brooks, LLP

(57) ABSTRACT

A wheel provided with a tire sensor unit having a sensor and a radio transmitter. The sensor detects a pressure and temperature of a tire, and generates a tire pressure data signal and a tire temperature data signal based on the pressure and temperature of the tire. The radio transmitter generates a data signal including the tire pressure data signal and the tire temperature data signal, and transmits the data signal by wireless.

14 Claims, 14 Drawing Sheets

FIG.7

| ID SIGNAL | | | | | | | | | Content |
|---|---|---|---|---|---|---|---|---|---|
| 0001 | 0000 | 0001 | 0000 | 0000 | 0000 | 0000 | 0000 | 0000 | LOCK CONTROL SIGNAL |
| 0001 | 0000 | 0001 | 0000 | 0001 | **** | **** | **** | **** | PRESSURE AND TEMPERATURE DATA OF RIGHT FRONT TIRE |
| 0001 | 0000 | 0001 | 0000 | 0010 | **** | **** | **** | **** | PRESSURE AND TEMPERATURE DATA OF LEFT FRONT TIRE |
| 0001 | 0000 | 0001 | 0000 | 0100 | **** | **** | **** | **** | PRESSURE AND TEMPERATURE DATA OF RIGHT REAR TIRE |
| 0001 | 0000 | 0001 | 0000 | 0101 | **** | **** | **** | **** | PRESSURE AND TEMPERATURE DATA OF LEFT REAR TIRE |

VEHICLE ID DATA SIGNAL — IDENTIFICATION DATA SIGNAL — TIRE PRESSURE DATA SIGNAL — TIRE TEMPERATURE DATA SIGNAL

FIG.9

| | 0min | 2min | 4min | 6min | 8min | 10min | 12min | 14min | 16min | 18min | 20min | 22min |
|---|---|---|---|---|---|---|---|---|---|---|---|---|
| OUTSIDE AIR TEMPERATURE | 16 | 16 | 16 | 16 | 16 | 16 | 16 | 16 | 16 | 16 | 16 | 16 |
| BRAKE ROTOR TEMPERATURE | 460 | 384 | 345 | 312 | 285 | 269 | 248 | 220 | 191 | 163 | 145 | 132 |
| ALUMINUM SPOKE TEMPERATURE | 80 | 89 | 93 | 91 | 90 | 87 | 83 | 81 | 79 | 74 | 71 | 68 |
| SENSOR TEMPERATURE | 36 | 41 | 44 | 47 | 50 | 51 | 52 | 52 | 52 | 51 | 50 | 48 |

TIRE PRESSURE DETECTION SYSTEM AND A WHEEL USED THEREIN

BACKGROUND OF THE INVENTION

1. Field of the Invention

The present invention relates to a tire pressure detection system, and a wheel used in this system.

2. Description of Relevant Art

Parameter data detection systems (tire pressure detection systems) that detect parameter data, such as pressure and temperature of tire, have been known. As an example of these parameter data detection systems, the system disclosed in Japanese unexamined patent publication JP H09-509488 (U.S. Pat. No. 6,087,930) has been discovered.

The parameter data detection system, disclosed in this patent publication, is composed of a sensor, a transponder, and a receiver. The sensor is attached to a tire when being used, and outputs parameter data obtained in accordance with a pressure and temperature of tire. The transponder transmits the parameter data by wireless. The receiver, provided at a place separate from the sensor, receives the parameter data transmitted from the transponder.

The parameter data detection system transmits the parameter data, such as pressure and temperature of tire, to the receiver by wireless when tire has punctured. Then, the receiver detects the occurrence of a puncture of tire based on the received parameter data.

As shown in FIG. 14, the transponder 70 is directly attached to a tire 71, and is discarded together with the tire 71 when replacing the tire 71 with new one.

The transponder 70, however, includes a radio frequency identification unit (RFID) that requires the excess manufacturing cost. Thus, higher running costs have been required for providing the parameter data detection apparatus.

Therefore, a tire pressure detection system that can be provided with low running costs and a wheel that can be used in this system have been required.

SUMMARY OF THE INVENTION

The present invention relates to a wheel provided with a tire sensor unit. In this tire sensor unit, a sensor and a radio transmitter are included. The sensor detects a pressure and temperature of a tire, and generates a tire pressure data signal and a tire temperature data signal based on the pressure and temperature of the tire. The radio transmitter generates a data signal including the tire pressure data signal and the tire temperature data signal, and transmits the data signal by wireless.

In this wheel, since the tire sensor unit is attached to the wheel, the tire sensor unit can be used continuously without discarding the tire sensor unit together with the tire when replacing the tire with new one. Thereby, the running cost of a tire pressure detection system adopting the present invention's tire can be reduced.

Here, it is preferable that the tire sensor unit is a flexible sheet. This is because the shape of the tire sensor unit can be transformed according to the shape of the mounting surface to which the tire sensor unit is attached. Thereby, the tire sensor unit can be surely attached to the mounting surface even though the shape of the mounting surface is a curved surface.

In the present invention's wheel, it is preferable that the tire sensor unit is provided at the position adjoining to an air valve disposed on a rim or the position opposite across a rotation center of wheel with respect to the air valve.

This is because the unbalance of the wheel can be predicted based on the position of the air valve, and the unbalance of the wheel can be adjusted in accordance with the predicted unbalance of the wheel.

In the present invention's wheel, it is preferable that the tire sensor unit is attached to the wheel using a bonding agent and an adhesive. Here, it is still more preferable that a bonding agent and adhesive, which are not containing a plasticizer, are used for attaching the tire sensor unit to the wheel.

This is because the provision of the tire pressure detection system can be easily performed unlike the conventional tire sensor unit, in which the complicated manufacturing process for providing the sensor within the tire is required.

Additionally, this is because the occurrence of the corrosion of the wheel due to an adhesive can be prevented even if the wheel is used for a long time or the wheel is exposed to the rapid temperature change condition, if a plasticizer is not contained in a bonding agent or an adhesive.

The present invention relates to a tire pressure detection system having a tire sensor unit, a radio transmitter, a wheel, and a receiver unit.

In this tire pressure detection system, the tire sensor unit attached to the wheel includes a sensor, which detects a pressure and temperature of a tire, and which generates a tire pressure data signal and a tire temperature data signal based on the pressure and temperature of the tire. The radio transmitter generates a data signal including the tire pressure data signal and the tire temperature data signal, and transmits the data signal to the receiver unit by wireless.

In this tire pressure detection system, the data signal transmitted from the tire sensor unit that includes the tire pressure data and the tire temperature data of tire is received by the receiver unit. Therefore, the pressure and temperature of the tire can be recognized at the position away from the tire.

According to this tire temperature detection system, the tire sensor unit can be used continuously without discarding the tire sensor unit together with the tire, when replacing the tire with new one. Thereby, the running cost of the tire pressure detection system can be reduced.

In this tire pressure detection system, it is preferable that a power supply mechanism, which supplies electric power driving the tire sensor unit to the tire sensor unit in a contactless manner, is provided. This is because the tire sensor unit does not require the specific power source for operating the tire sensor unit and the weight of the tire sensor unit thus can be minimized. Thereby, the influence due to the weight of the tire sensor unit on the unbalance of the wheel can be reduced.

In this tire pressure detection system, it is preferable that a carrier frequency, used in a keyless entry system of a vehicle door lock mechanism, is used for exchanging data signal between the radio transmitter and the receiver unit. This is because the new frequency domain for the transmission of the carrier wave is not required for providing the tire pressure detection system, and the required cost for providing the air pressure detection system can be reduced.

In this tire pressure detection system, it is preferable that a tire fault detector having following functions is provided.

1) Computing a tire pressure and tire temperature based on the data signal,

2) Comparing the tire pressure and tire temperature with respective threshold values of the tire pressure and tire temperature, and 3) Raising an alarm, using at least one of a beep sound and a flash of light, in order to notify the occurrence of a trouble of tire, when the pressure of tire is below a predetermined value and the temperature of tire exceeds a predetermined temperature.

In the vehicle adopting the present invention's tire pressure detection system, if the tire has punctured, the pressure of tire becomes progressively low and the temperature of tire becomes progressively high.

In this case, the data signal including the tire pressure data signal and tire temperature data signal, which are obtained from the tire pressure and tire temperature, is entered to the tire fault detector. Therefore, if the reference values of the tire pressure and tire temperature at the time of the puncture of tire are previously established, the tire fault detector can detect the occurrence of the puncture of tire by comparing the value of the tire pressure and tire temperature with the reference values of the tire pressure and temperature.

Thereby, the tire fault detector can notify the occurrence of the puncture of tire to the driver of vehicle by raising an alarm, using at least one of a beep sound and a flash of light.

BRIEF DESCRIPTION OF THE DRAWINGS

FIG. 7 is an explanatory view showing the construction of the data signal D1.

FIG. 9 is a table showing the result of the evaluation test of the tire.

DETAILED DESCRIPTION OF THE PREFERRED EMBODIMENT

Preferred embodiments of a tire pressure detection system according to the present invention will be explained with reference to the attached drawings.

Tire Pressure Detection System

Figure 1:
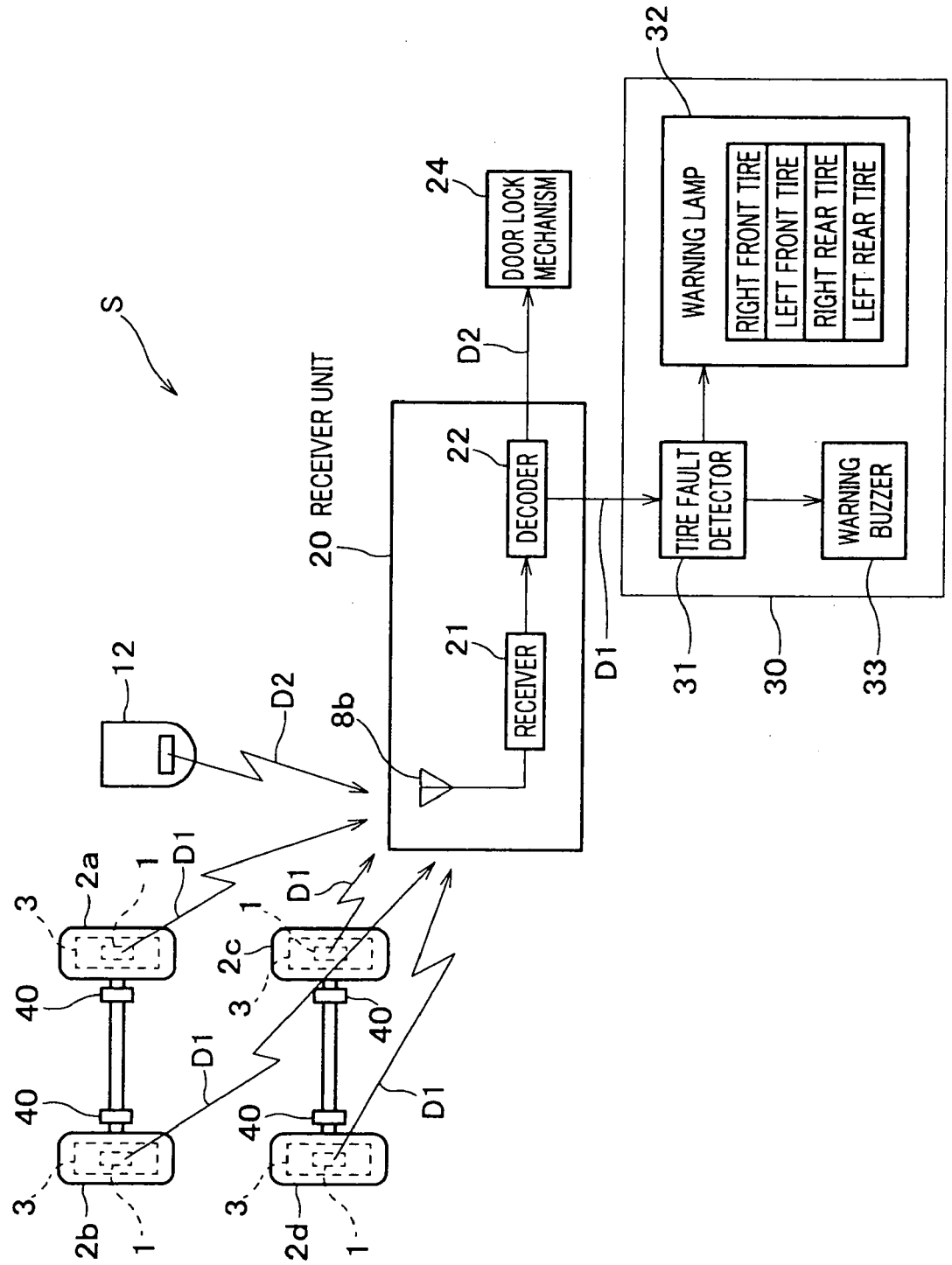
FIG. 1 is a schematic view of the tire pressure detection system.

As shown in FIG. 1, a tire pressure detection system S includes a tire sensor unit 1, a receiver unit 20, a display unit 30, and a power supply unit 40.

The tire sensor unit 1 is provided on respective wheels 3 of tires 2 (2a, 2b, 2c, and 2d). In the present embodiment, each of tire sensor units 1 is one of the same constructions. Thus, for convenience, the following explanation is directed to a tire sensor unit 1.

The tire sensor unit 1 generates a data signal D1 based on a pressure and temperature of tire 2, and transmits the data signal D1 to the receiver unit 20 using the radio transmission technique.

The display unit 30 displays the occurrence of a trouble of tire 2 (hereinafter indicated as "tire fault"), when it is judged that the tire fault has occurred by comparing the tire pressure and tire temperature, which are obtained from the data signal D1, with threshold values of the tire pressure and tire temperature, which have been established previously, respectively. The power supply unit 40 supplies power, driving the tire sensor unit 1, to the tire sensor unit 1 in a contactless manner.

Next, the explanation of respective components of the tire pressure detection system S will be given in order of: the wheel 3, power supply unit 40, receiver unit 20, and display unit 30.

Wheel

As shown in FIG. 1, each of tires (a right front tire 2a, a left front tire 2b, a right rear tire 2c, and a left rear tire 2d) is provided with the wheel 3.

Figure 2:
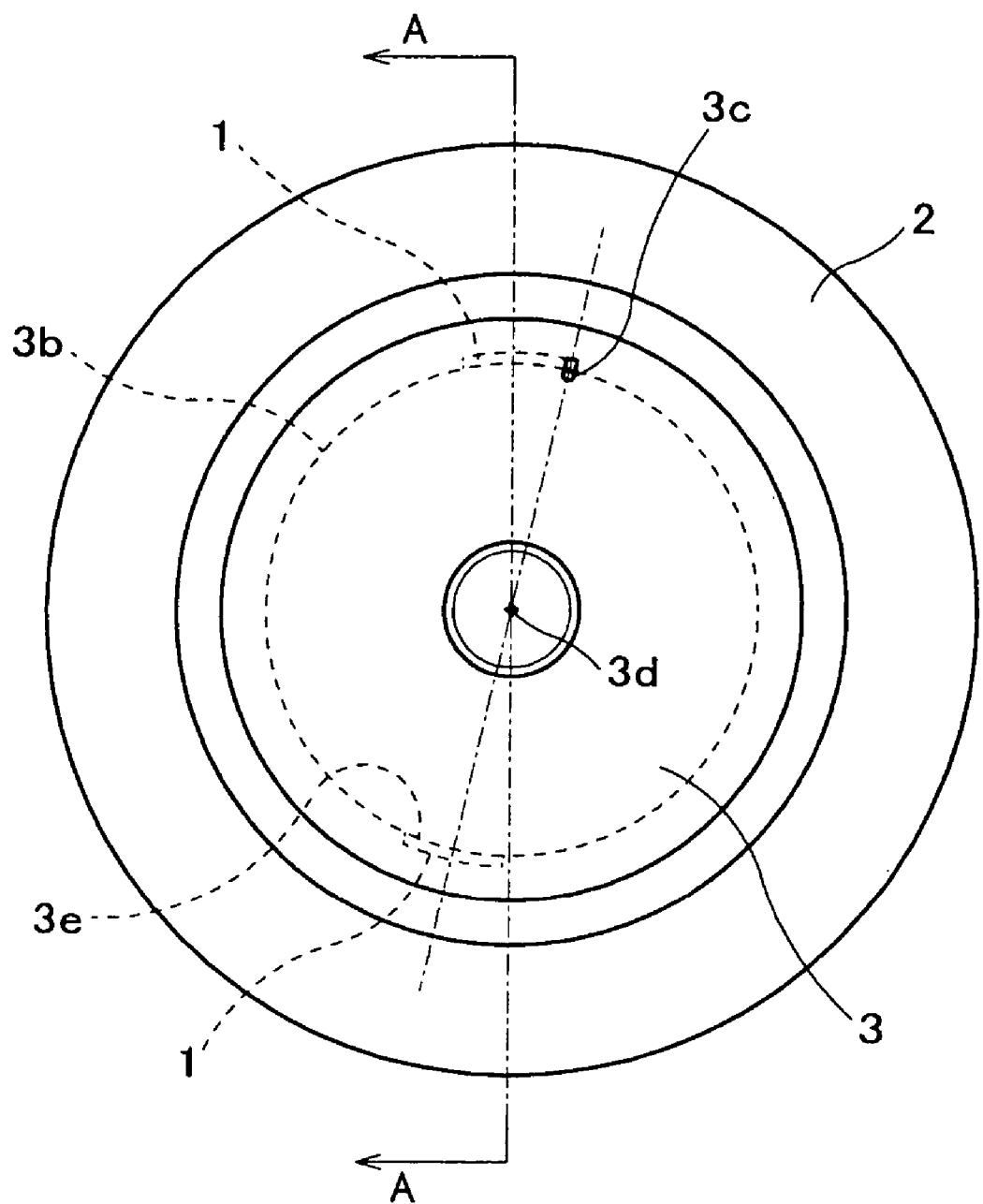
FIG. 2 is a side view of the wheel used in the tire pressure detection system.
Figure 3:
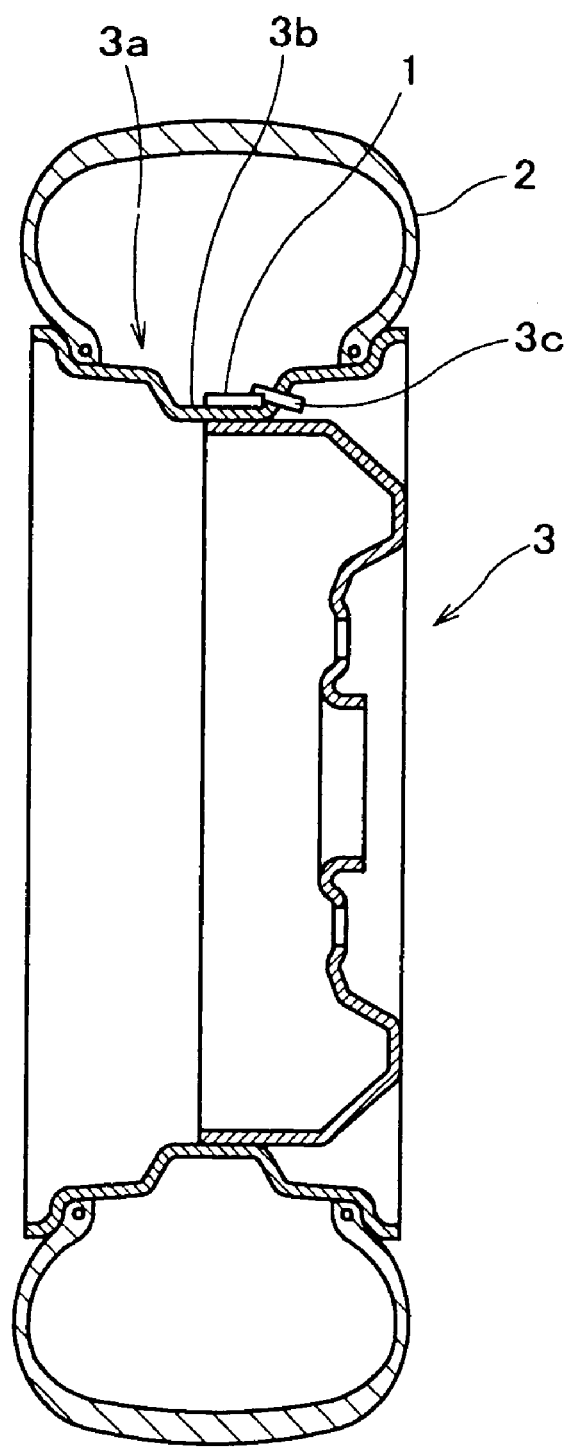
FIG. 3 is a sectional view along the line A—A of FIG. 2.

As can be seen from FIG. 2 and FIG. 3, each wheel 3 is provided with the tire sensor unit 1 on a well 3b of the rim 3a. Here, the position where the tire sensor unit 1 is provided is the position adjacent to an air valve 3c of the rim 3a.

As shown in FIG. 2, another preferable position of the tire sensor unit 1 is, for example, the position 3e opposite across a rotation center 3d of the wheel 3 with respect to the air valve 3c. Additionally, the position which is the position adjoining to the air valve 3c or which is in an opposite side with respect to the position 1 across the air valve 3c may be adoptable.

The tire sensor unit 1 is attached to the well 3b of the wheel 3 using a bonding agent or an adhesive tape coated with an adhesive.

In the present embodiment, a bonding agent and adhesive without a plasticizer, such as Dibutyl phthalate and Butyl benzyl phthalate, are used.

In the present embodiment, the bonding agent, in which a polymer having a silyl group, such as Dimethoxysilyl group, at terminal thereof is contained as base compounds, is suitable for use as the bonding agent. In this case, the bonding agent, as appropriate, may contain inorganic filler, such as a calcium carbonate, and a curing agent.

Here, preferably, the content of the base compound among the bonding agent is from 50 to 60 weight percent. If the content of base compounds is below 50 weight percent, the adhesive strength may be decreased. On the contrary, if the content of the base compounds exceeds 60 weight percent, since the flow ability of the bonding agent become worse, the uniform coating of the bonding agent may be disturbed.

Here, the content of inorganic filler is, preferably, ranges from 35 to 45 weight percent.

If the content of the inorganic filler is below 35 weight percent, the adhesive strength may be decreased. On the contrary, if the content of the inorganic filler exceeds 45 weight percent, the uniform coating of the bonding agent may be disturbed. The remaining part of the bonding agent is the curing agent. In the present embodiment, the content of respective components is variable within the above described range as long as sum of the respective components never exceeds 100.

As an example of the adhesive tape, for example, a two-sided tape made of acrylic foam, both sides of which are coated with an adhesive, can be cited.

As an example of the adhesive, the adhesive, which contains 70 weight percent of at least one of Alkyl methacrylate and Vinyl ester, and 30 weight percent of a polar monomer, can be cited.

Here, N-vinyl-2-pyrrolidone, N-vinylcaprolactam, Acrylonitrile, Vinylacrylate, Diallylphthalate, Acrylic acid, Methacrylic acid, Itaconic acid, Hydroxyalkylacrylate, Cyanoalkylacrylate, Acrylamide, Substituted acrylamide, and mixture containing at least two of these components can be example of the polar monomer.

Tire Sensor Unit

Figure 4:
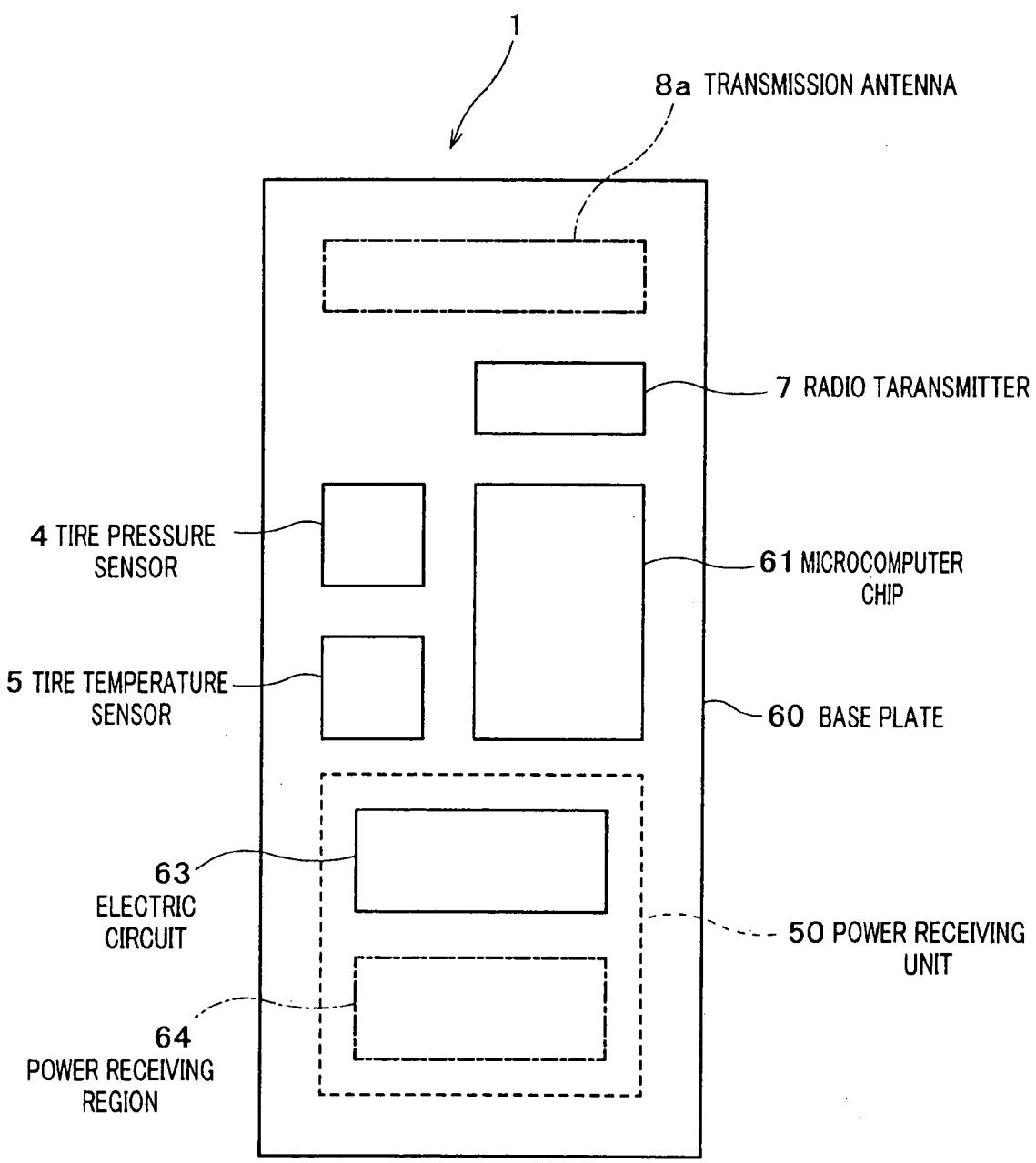
FIG. 4 is a plane view of the tire sensor unit attached to the wheel of FIG. 2.

As shown in FIG. 4, the tire sensor unit 1 is a flexible plate-shaped member (flexible plate), and is composed of a tire pressure sensor 4, a tire temperature sensor 5, a microcomputer chip 61, a radio transmitter 7, a transmission antenna 8a, a power receiving unit 50, and a base plate (circuit) 60.

The respective tire pressure sensor 4 and tire temperature sensor 5 are composed of semiconductor chips, the microcomputer chip 61 serves as a controller for controlling the transmission (transmission controller 13), the power receiving unit 50 includes an electric circuit 63 and a power receiving region 64. The base plate 60, provided with these components thereon, is covered with a flexible sheet (not shown). Here, a resin sheet, made of Acrylic resin, can be used as a flexible sheet.

Figure 5:
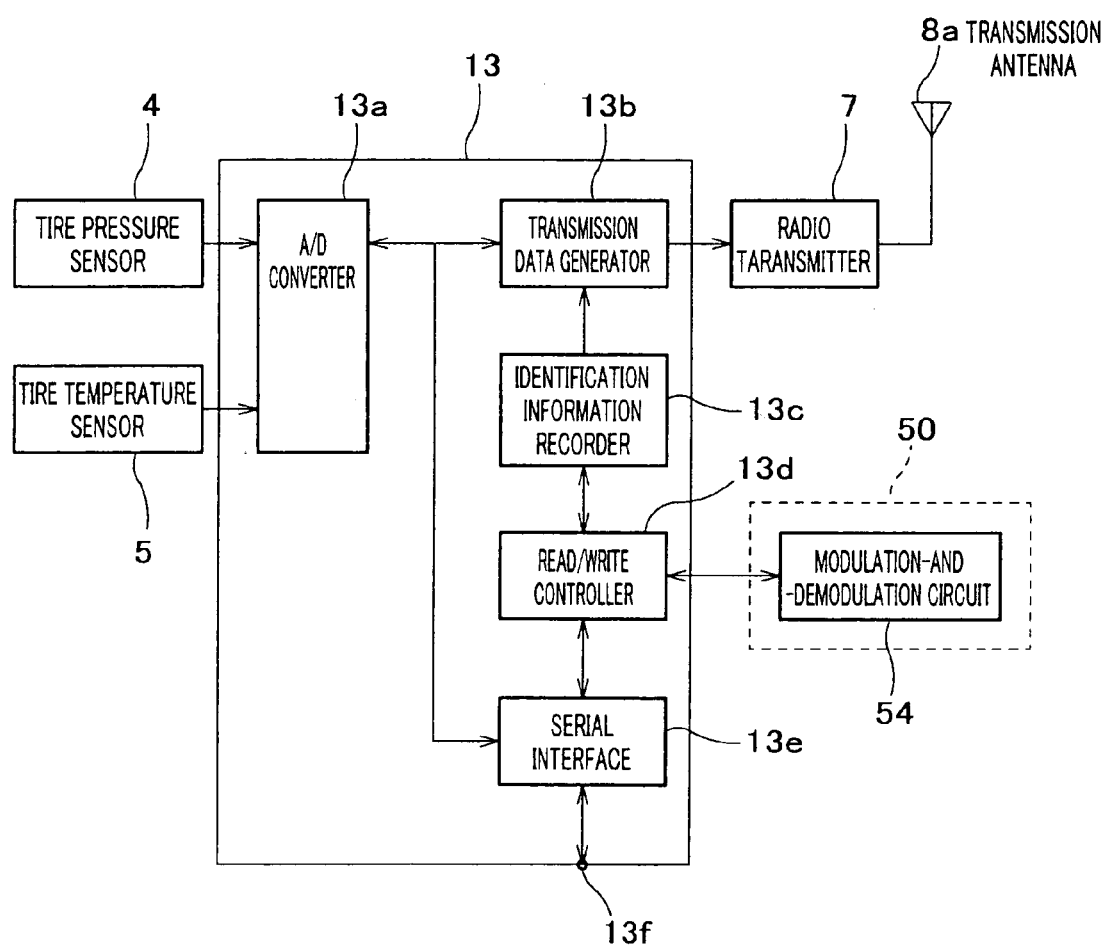
FIG. 5 is a block diagram of the tire sensor unit shown in FIG. 4.

As can be seen from FIG. 4 and FIG. 5, the transmission controller 13 is electrically connected with the tire pressure sensor 4 and the tire temperature sensor 5, and is also connected with the transmission antenna 8a through the radio transmitter 7.

The transmission controller 13 includes an A/D converter 13a, a transmission data generator 13b, an identification information recorder 13c, a read/write controller 13d, a serial interface 13e, and a group of input/output ports 13f. Here, the group of input/output ports 13f is arrayed on an exterior of the tire sensor unit 1, and the access from outside to the tire sensor unit 1 is allowed through the respective input/output ports 13f.

The input/output port 13f is used for holding information, such as a vehicle ID and a tire ID, on the identification information recorder 13c, when installing the tire pressure detection system S or replacing the tire 2 with new one. Here, the vehicle ID is a unique identification number that differs in every vehicle. The tire ID is a unique identification number that differs in each tire.

The A/D converter 13a is electrically connected to the tire pressure sensor 4 and tire temperature sensor 5, and converts tire pressure data signal and tire temperature data signal in the analog format into those in the digital format. Here, the tire pressure data signal is a signal indicating a value of the pressure of tire and is measured by the tire pressure sensor 4. The tire temperature data signal is a signal indicating a value of the temperature of tire and is measured by the tire temperature sensor 5.

The transmission data generator 13b is connected to the A/D converter 13a, and controls the A/D converter 13a so that the A/D converter 13a is activated for every predetermined time. The transmission data generator 13b temporarily holds the tire pressure data signal and tire temperature data signal when the tire pressure data signal and tire temperature data signal are entered from the A/D converter 13a.

The transmission data generator 13b obtains the tire pressure data and tire temperature data from the tire pressure data signal and tire temperature data signal, respectively. The transmission data generator 13b computes the difference in value between the obtained tire pressure data and the previous tire pressure data, and the difference in value between the obtained tire temperature data and the previous tire temperature data.

If the difference of tire pressure or the difference of tire temperature exceeds a predetermined threshold value, the transmission data generator 13b generates transmission data, which will be explained later in details.

The transmission data includes tire pressure data, tire temperature data, the tire ID, the vehicle ID. Here, tire pressure data is data which has a lower value between the two pieces of tire pressure data used for computing the difference. The tire temperature data is data which has a higher value between the two pieces of tire pressure data used for computing the difference. The tire ID is data (tire identification information) to be used for identifying the tire in which the fault has occurred. The vehicle ID is data (vehicle identification information) to be used for identifying the vehicle having the tire with fault.

The transmission data generator 13b generates the transmission data using the vehicle ID, the tire ID, the tire temperature data, and tire pressure data. Here, the vehicle ID and tire ID are obtained by referring to the identification information recorder 13c. Then, the transmission data generator 13b supplies the transmission data to the radio transmitter 7.

The identification information recorder 13c is electrically connected to the transmission data generator 13b. The identification information recorder 13c is a recording medium, such as a nonvolatile memory, and holds the tire ID and the vehicle ID therein. Here, the tire ID is a unique identification number to be used for making a distinction between a front right tire 2a, a front left tire 2b, a rear right tire 2c, and a rear left tire 2d (see FIG. 1).

The read/write controller 13d is electrically connected to the identification information recorder 13c, and also connected to input/output ports 13f through the serial interface 13e. The read/write controller 13d stores the vehicle ID and the tire ID in the identification information recorder 13c, when a record command signal, including data signal of the vehicle ID and the tire ID, is entered through input/output ports 13f.

The read/write controller 13d is electrically connected to a modulation-and-demodulation circuit 54 of the power receiving unit 50. Therefore, the read/write controller 13d also stores the vehicle ID and the tire ID in the identification information recorder 13c, when the record command signal is entered from the modulation-and-demodulation circuit 54.

In the present embodiment, the vehicle ID and the tire ID, stored in the identification information recorder 13c, are replaced with new one, when the new vehicle ID and the tire ID are entered.

The read/write controller 13d is also electrically connected to the A/D converter 13a through the serial interface 13e.

The read/write controller 13d makes the A/D converter 13a output the tire pressure data signal and the tire temperature data signal to an external device through the serial interface 13e, when the output command signal is entered through input/output ports 13f. In other words, the A/D converter 13a outputs the tire pressure data signal and the tire temperature data signal to an external device through input/output ports 13f, when the output command signal is entered to the read/write controller 13d.

The read/write controller 13d, additionally, obtains the tire pressure data signal and the tire temperature data signal from the A/D converter 13a through the serial interface 13e and supplies them to the modulation-and-demodulation circuit 54, when the output command signal is entered from the modulation-and-demodulation circuit 54.

In the present embodiment, the tire pressure data signal and the tire temperature data signal, which are obtained through the input/output port 13f or the modulation-and-demodulation circuit 54, are used for checking whether or not the A/D converter 13a is working normally.

The radio transmitter 7 generates the data signal D1 (see FIG. 1). This data signal D1 is obtained from the transmission data supplied from the transmission data generator 13b, by a modulation of a carrier wave of a predetermined carrier frequency using a conventional modulation method. Then, the radio transmitter 7 transmits the data signal D1 from the transmission antenna 8a using radio transmission technique.

In the present invention's tire pressure detection system S, the modulation method and a carrier frequency used in a conventional keyless entry system are used.

Figure 12:
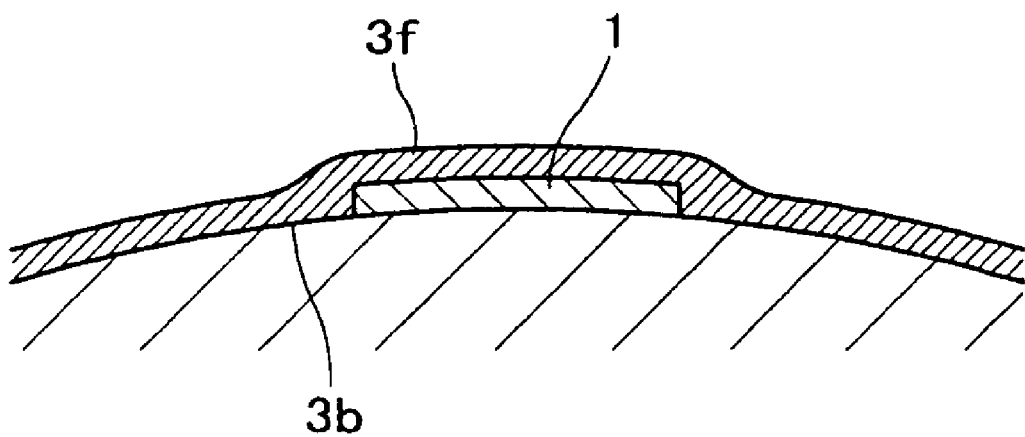
FIG. 12 is a cross-sectional view of the part of the wheel of another embodiment.

To be more precise, since the keyless entry system is a system that controls the lock-and-unlock of the vehicle using a radio (wireless) communication technique, the present invention's tire pressure detection system S adopts the modulation method and the carrier frequency, which are used in a keyless entry signal transmitter 12 (see FIG. 12) that transmits a signal for controlling the lock-and-unlock of the door key.

Figure 6:
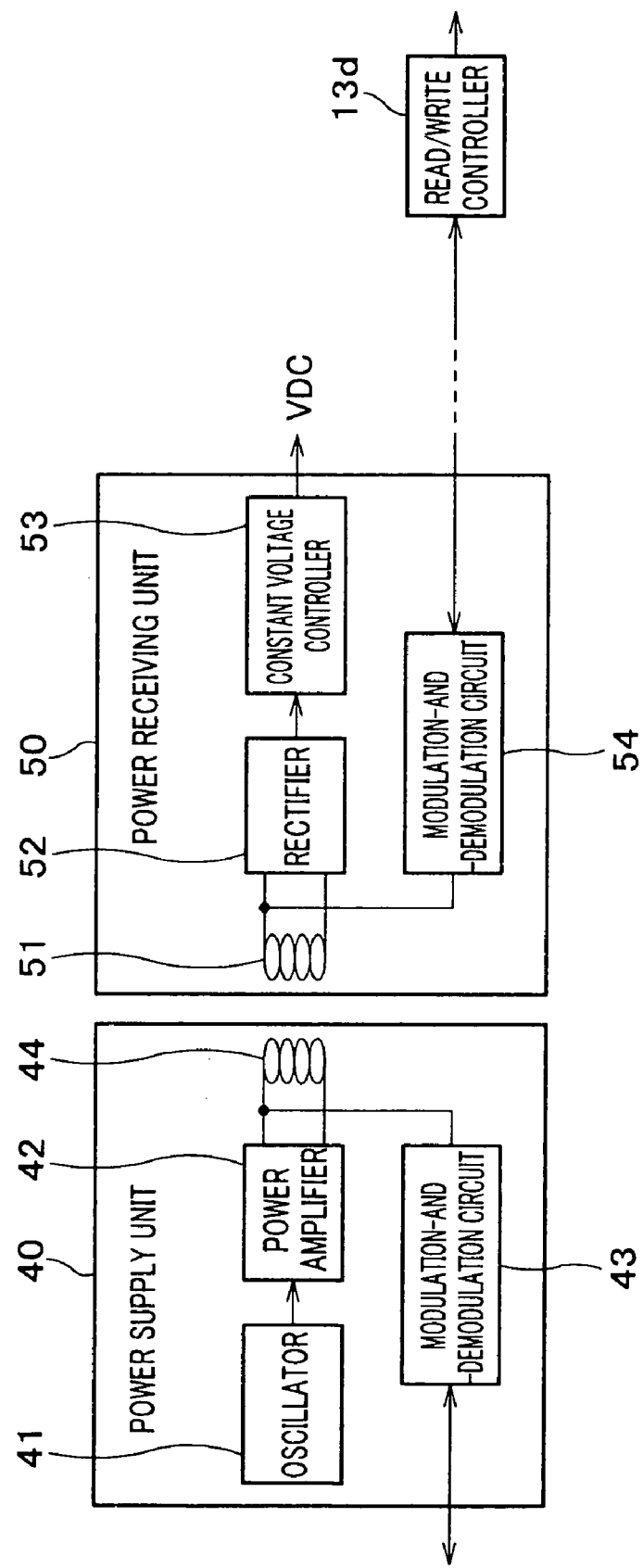
FIG. 6 is a block diagram of the power supply unit of the tire pressure detection system of FIG. 1 and the power-receiving unit of the tire sensor unit of FIG. 4.

As shown in FIG. 6, the power receiving unit 50 supplies electric power to the tire sensor unit 1. The power receiving unit 50 includes a receiver coil 51, a rectifier 52, a constant voltage controller 53, and a modulation-and-demodulation circuit 54. Here, the receiver coil 51 is disposed within the power receiving region 64 of FIG. 4, and the rectifier 52, the constant voltage controller 53, and the modulation-and-demodulation circuit 54 are disposed within the electric circuit 63 of FIG. 4.

The receiver coil 51 is not directly connected to a transmission coil 44 of the power supply unit 40, but is electromagnetically coupled to the transmission coil 44. In other words, the receiver coil 51 is coupled to the transmission coil 44 by the electromagnetically induced coupling.

The, receiver coil 51 receives the radio wave transmitted from the transmission coil 44 and induces an alternating current.

The rectifier 52 is electrically connected to the receiver coil 51, and rectifies an alternating current induced in the receiver coil 51 in order to obtain a direct current.

The constant voltage controller 53 is electrically connected to the rectifier 52, and stabilizes the direct current generated by the rectifier 52. Thus, the constant voltage controller 53 outputs a direct current VDC to be used in the tire sensor unit 1.

The modulation-and-demodulation circuit 54 demodulates the modulated record command signal and modulated output command signal, which are transmitted from the transmission coil 44 of the power supply unit 40, when holding the tire ID and the vehicle ID in the identification information recorder 13c or when checking whether or not each of the tire pressure sensor 4, the tire temperature sensor 5, and the A/D converter 13a is functioning normally (accurately).

The modulation-and-demodulation circuit 54 modulates the tire pressure data signal and tire temperature data signal, which are obtained from the read/write controller 13d in accordance with the record command signal supplied to the read/write controller 13d, and transmits the modulated tire pressure data signal and the modulated tire temperature data signal to the transmission coil 44 of the power supply unit 40 through the receiver coil 51.

Power Supply Unit

The power supply unit 40 transmits the radio wave that induces an alternating current on the receiver coil 51 of the power receiving unit 50. As shown in FIG. 6, the power supply unit 40 includes an oscillator 41, a power amplifier 42, transmission coil 44, and a modulation-and-demodulation circuit 43. The oscillator 41 used in this embodiment generates high frequency wave of ranges on the order of 10 to 100 kHz The power amplifier 42 is electrically connected to the oscillator 41, and amplifies the power of high frequency wave generated by the oscillator 41. Then, the amplified high frequency wave is transmitted through the transmission coil 44 which is connected to the power amplifier 42.

The modulation-and-demodulation circuit 43 modulates the record command signal and output command signal, which will be transmitted toward the receiver coil 51 of the power receiving unit 50, and obtains the modulated record command signal and the modulated output command signal.

The modulation-and-demodulation circuit 43, on the contrary, demodulates the modulated tire pressure data signal and modulated tire temperature data signal, which are transmitted from the receiver coil 51 of the power receiving unit 50 and are received through the transmission coil 44. Thus, the modulation-and-demodulation circuit 43 obtains the tire pressure data signal and the tire temperature data signal.

In the present embodiment, any place of the vehicle may be acceptable as the position, where the power supply unit 40 is disposed. But, it is still more preferable that the power supply unit 40 is provided in the vicinity of the wheel 3.

The power supply unit 40 may be provided together with a speed sensor of the anti lock braking system (ABS). In this case, the power supplied from the battery, mounted on the vehicle body, can be adoptable as the power for operating the power supply unit 40.

Here, the power supply unit 40 and the power receiving unit 50 can be made by using GaAs semiconductor Receiver Unit As shown in FIG. 1, the receiver unit 20 includes a receiving antenna 8b, a receiver 21, and a decoder 22. In the present embodiment, a receiving apparatus used in a keyless entry system is adopted as the receiver unit 20.

The receiver 21 receives a modulated lock control signal D2 transmitted from the keyless entry signal transmitter 12, and the modulated data signal D1 transmitted from the transmission antenna 8a of the tire sensor unit 1, and performs the demodulation of the modulated lock control signal D2 and the modulated data signal D1 in order to obtain the lock control signal D2 and the data signal D1. Here, the lock control signal D2 is a signal, which commands the door-lock mechanism 24 of the door to control the lock-and-unlock of the door.

The decoder 22 is electrically connected to the receiver 21, and checks the destination of received data (the lock control signal D2, and the data signal D1) based on the identification data attached to respective signals. Then, the decoder 22, based on the destination, supplies the data signal D1 and the lock control signal D2 to the display unit 30 and the door-lock mechanism 24, respectively.

Display Unit

As can be seen from FIG. 1, the display unit 30 includes a tire fault detector 31, a warning lamp 32 and a warning buzzer 33, which are connected to the tire fault detector 31.

The tire fault detector 31 judges whether or not a trouble is occurring on tire based on the data signal D1 entered from the decoder 22. To be more precise, the tire fault detector 31 judges that a trouble is occurring, when the pressure of tire 2 is below a predetermined value and the temperature of tire 2 exceeds a predetermined temperature. The tire fault detector 31 sounds a beep sound from the warning buzzer 33, when the tire fault detector 31 judges that a trouble is occurring.

In this occasion, additionally, the tire fault detector 31 identifies the tire having a trouble, and turns on the warning lamp 32 corresponding to the tire with trouble.

Operation of Tire Pressure Detection System

Next, the operation of the tire pressure detection system S will be explained.

In the following explanation, the method for detecting a tire blowout using the tire pressure detection system S will be explained as an example of the operation of the tire pressure detection system S.

In the tire pressure detection system S, as shown in FIG. 5, the A/D converter 13a is activated at a series of definite times by the transmission data generator 13b in order to converts the format of the tire pressure data signal and tire temperature data signal, which are obtained from the tire pressure sensor 4 and the tire temperature sensor 5, respectively, into digital format data thereof.

Next, the transmission data generator 13b temporarily holds the tire pressure data and tire temperature data, which are computed from the tire pressure data signal and the tire temperature data signal.

Then, the transmission data generator 13b compares at predetermined intervals the tire pressure data (current tire pressure data) and the tire temperature data (current tire temperature data), which are supplied from the A/D converter 13a, with the previous tire pressure data and the previous tire temperature data, which were supplied from the A/D converter 13a and were held therein. Then, the transmission data generator 13b computes the difference (pressure difference) between the current tire pressure data and the previous tire pressure data, and the difference (temperature difference) between the current tire temperature data and the previous tire temperature data.

When one of these differences (pressure difference and temperature difference) is not within the range of permissible zone, i.e. if the pressure difference or the temperature difference exceeds a threshold value, the transmission data generator 13b refers to the vehicle ID and the tire ID, which are stored in the identification information recorder 13c, and generates the transmission data. Then, the transmission data generator 13b supplies the transmission data to the radio transmitter 7.

The radio transmitter 7 generates the data signal D1 from the transmission data entered from the transmission data generator 13b (see FIG. 1). The data signal D1 is obtained by modulating the transmission data into the carrier wave, which is used in a conventional modulation method adopted in the keyless entry signal transmitter 12 (See FIG. 1).

As shown in FIG. 7, the data signal D1 is a 36 bits of data. This data signal D1 is composed of a vehicle ID data signal (16 bits), an identification data signal (4 bits), a tire pressure data signal (8 bit), and a tire temperature data signal (8 bit).

Here, the identification data signal is a data to be used for identifying specific tire from among tires 2a, 2b, 2c, and 2d.

The lock control signal D2 transmitted from keyless entry signal transmitter 12 is the same kind of data as the identification data, and is distinct from the data signal D1.

In this embodiment, as shown in FIG. 7, signals (8 bits) written in the column corresponding to the tire pressure signal are assigned to a lock signal of the keyless door, and signals (8 bits) written in the column corresponding to the tire temperature data are assigned to a unlock signal of the door. Here, the lock signal is a signal that commands the lock of the door, and the unlock signal is a signal that commands the un-lock of the door.

The receiver 21 of the receiver unit 20 receives the data signal D1 through the receiving antenna 8b, and demodulates the data signal D1.

In the receiver unit 20, the lock control signal D2 transmitted from the keyless entry signal transmitter 12 is received in addition to the data signal D1. Thus, the decoder 22 checks the destination of data based on the identification data attached to the data. That is, the data signal D1 is supplied to the display unit 30 and the lock control signal D2 is supplied to the door-lock mechanism 24.

In the display unit 30, the data signal D1 entered from the decoder 22 is supplied to the tire fault detector 31 (see FIG. 1).

The tire fault detector 31 judges that a trouble is occurring, when the pressure of tire 2 is below a predetermined value and the temperature of tire 2 exceeds a predetermined temperature. Then, the tire fault detector 31 sounds a beep sound from the warning buzzer 33.

In this occasion, additionally, the tire fault detector 31 identifies the tire with trouble, and turns on the warning lamp 32 corresponding to the tire with trouble.

Thereby, a driver of the vehicle adopting the present invention's tire pressure detection system S is notified of the occurrence of the trouble of the tire 2 by the beep sound of the warning buzzer 33 and the flush of the warning lamp 32. In this embodiment, since each of tires has a corresponding warning lamp, the driver of the vehicles can recognize the tire with trouble from among tires.

In the present embodiment, for determining a threshold value, the standard value of the tire pressure is established at about $1.96 \times 10^5$ Pa (2.0 kgf/cm$^2$), and the proper temperature of tire is established from 50 to 60° C.

Figure 8:
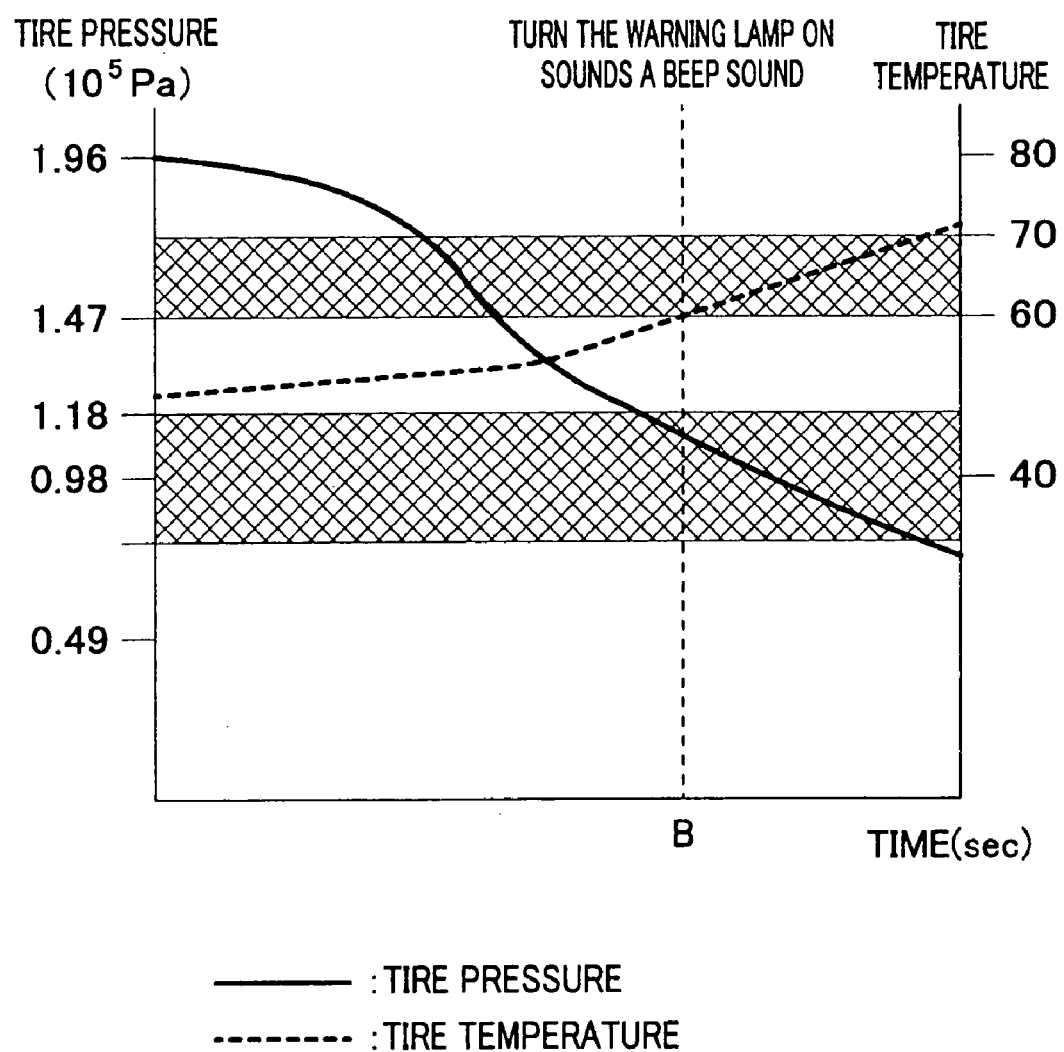
FIG. 8 is a graph showing changes of the tire pressure and tire temperature when the tire has punctured.

As shown in FIG. 8, for example, if the tire has punctured, the tire pressure falls into the range from $1.18 \times 10^5$ to $0.78 \times 10^5$ Pa, and the tire temperature raises to the range from 60 to 70° C.

In the present embodiment, therefore, the threshold value of the tire pressure is established at $1.18 \times 10^5$ Pa, and the threshold value of the tire temperature is established at 60° C.

In the present embodiment, therefore, if the tire temperature exceeds 60° C. (at point B), in order to notify the driver of the occurrence of a trouble, a beep sound is emitted from the warning buzzer 33 and the warning lamp 32 is turned on.

Storage of Vehicle ID and Tire ID through the Input/Output Port

Next, the method for holding the vehicle ID and the tire ID on the identification information recorder 13c will be explained.

Firstly, the control of the storage of the vehicle ID and the tire ID in the identification information recorder 13c that is performed through the input/output port 13f will be explained.

Referring to FIG. 5, when the record command signal is entered from the input/output port 13f of the transmission controller 13, the record command signal is supplied to the read/write controller 13d through the serial interface 13e.

Here, the supply of the record command signal to the input/output port 13f is achieved by connecting an input terminal, i.e., the terminal of an external device, to the input/output port 13f.

Then, the read/write controller 13d stores the vehicle ID and tire ID in the identification information recorder 13c, in accordance with the record command signal. Thereby, the storage of the vehicle ID and the tire ID is terminated.

Storage of Vehicle ID and Tire ID through the Power Supply Unit

Next, the control of the storage of the vehicle ID and the tire ID on the identification information recorder 13c that is performed through the power supply unit 40 will be explained.

Referring to FIG. 6, when the record command signal is supplied to the modulation-and-demodulation circuit 43 of the power supply unit 40, the modulation-and-demodulation circuit 43 modulates the record command signal. Then, the modulation-and-demodulation circuit 43 transmits the modulated record command signal through the transmission coil 44.

Here, the input of record command signal to the modulation-and-demodulation circuit 43 is, for example, achieved by using an input terminal, which is electrically connected to the modulation-and-demodulation circuit 43 and which is disposed in the vehicle cabin.

The modulation-and-demodulation circuit 54 of the power receiving unit 50 receives the modulated record command signal through the receiver coil 51, and demodulates the modulated record command signal. Then, the modulation-and-demodulation circuit 54 supplies the record command signal to the read/write controller 13d of the transmission controller 13 (see FIG. 5 and FIG. 6).

The read/write controller 13d stores the vehicle ID and tire ID in the identification information recorder 13c, in accordance with the record command signal. Thereby, the storage of the vehicle ID and the tire ID is terminated.

Output of the Tire Pressure Data Signal and Tire Temperature Signal through the Input/Output Port Next, the control of the output of the tire pressure data signal and tire temperature data signal from the A/D converter 13a that is performed through the input/output port 13f will be explained.

Referring to FIG. 5, when the output command signal is entered from the input/output port 13f of the transmission controller 13, the output command signal is supplied to the read/write controller 13d through the serial interface 13e.

Here, the supply of output command signal to the input/output port 13f is achieved by connecting an input terminal, i.e., the terminal of an external device, to the input/output port 13f.

Then, the A/D converter 13a, in accordance with the command signal entered from the read/write controller 13d that is generated based on the output command signal, outputs the tire pressure data signal and tire temperature data signal to the input/output port 13f through the serial interface 13e. Thereby, the output of the tire pressure data signal and tire temperature data signal is terminated.

Output of the Tire Pressure Data Signal and Tire Temperature Signal through the Power Supply Unit Next, the control of the output of the tire pressure data signal and tire temperature data signal from the A/D converter 13a that is performed through the power supply unit 40 will be explained.

Referring to FIG. 6, when the output command signal is supplied to the modulation-and-demodulation circuit 43 of the power supply unit 40, the modulation-and-demodulation circuit 43 modulates the output command signal. Then, the modulation-and-demodulation circuit 43 transmits the modulated output command signal through the transmission coil 44.

Here, the input of output command signal to the modulation-and-demodulation circuit 43 is, for example, achieved by using an input terminal, which is electrically connected to the modulation-and-demodulation circuit 43 and which is disposed in the vehicle cabin.

The modulation-and-demodulation circuit 54 of the power receiving unit 50 receives the modulated output command signal through the receiver coil 51, and demodulates the modulated output command signal. Then, the modulation-and-demodulation circuit 54 transmits the output command signal to the read/write controller 13d of the transmission controller 13 (see FIG. 5 and FIG. 6).

The read/write controller 13d obtains the tire pressure data signal and the tire temperature signal from the A/D converter 13a, through the serial interface 13e, and supplies them to the modulation-and-demodulation circuit 54 of the power receiving unit 50.

The modulation-and-demodulation circuit 54 modulates the tire pressure data signal and the tire temperature data signal, and transmits the obtained modulated tire pressure data signal and modulated tire temperature data signal, through the receiver coil 51.

The modulation-and-demodulation circuit 43 of the power supply unit 40 receives the modulated tire pressure data signal and modulated tire temperature data signal, through the transmission coil 44, and performs the demodulation of them. Then, the modulation-and-demodulation circuit 43 outputs the tire pressure data signal and tire temperature data signal. Thereby, the output of the tire pressure data signal and tire temperature data signal is terminated.

In the present embodiment, additionally, checking whether or not the tire pressure sensor 4, tire temperature sensor 5, and A/D converter 13a (FIG. 5) are accurately running can be achieved based on the tire pressure data and tire temperature data, which are displayed on the display unit 30. Here, the tire pressure data and tire temperature data are computed based on the tire pressure data signal and the tire temperature data signal, which are supplied from the modulation-and-demodulation circuit 43 or are supplied from the input/output port 13f.

Evaluation Test

The evaluation test, under following conditions, has been carried out with regard to the wheel used in the tire pressure detection system S.

<Wheel>

Here, the evaluation test is performed using two wheels. One of wheels is the wheel in which the tire sensor unit is provided on the well of the rim using a bonding agent, and in which the tire sensor unit is provided adjoining to the air valve. The other of the wheels is the wheel, in which the tire sensor unit is provided on the well of the rim using a two-sided tape made of acrylic foam.

<Composition of the Bonding Agent>
Polypropylene oxide containing a dimethoxy silyl group: 57 weight percent.
Calcium carbonate: 40 weight percent
Catalyst: 3 weight percent <Condition>

The evaluation test of the wheel, using a vehicle equipped with the wheel of present invention, was performed by repeating the acceleration and slowdown of the traveling speed of the vehicle by turns. In this evaluation test, to be more precise, the slowdown of the traveling speed of the vehicle to 40 km/h from 60 km/h by braking at the rate of 4.9 m/s$^2$ (0.5 G), and the acceleration of the traveling speed of the vehicle up to 60 km/h, were repeated 100 times.

<Result>

Figure 10:
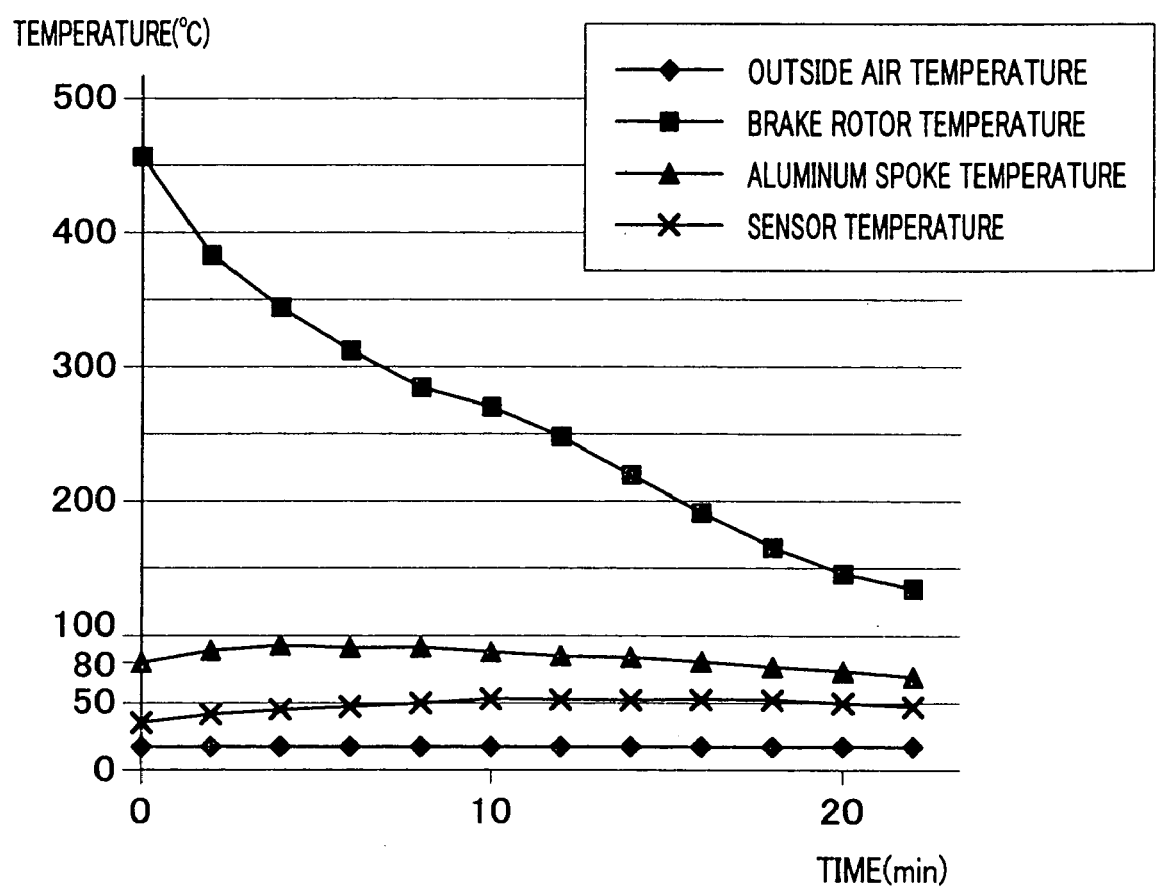
FIG. 10 is a graph showing the result of the evaluation test of the tire.

The timewise change of the temperature of the sensor (temperature sensor), brake rotor, and aluminum spoke is shown in FIG. 9 and FIG. 10.

As can be seen from FIG. 9 and FIG. 10, the temperature of the sensor was kept stable at ° C., i.e. near 50° C. This indicates that the temperature of the sensor is not affected by the temperature of the brake rotor. Additionally, the tire sensor unit, under the condition the temperature of wheel changes rapidly, was not dropped off from the rim.

Benefits of Wheel

According to the wheel 3, since the tire sensor unit 1 is provided on the wheel 3, the tire sensor unit 1 can be used continuously without discarding the tire sensor unit 1 together with the tire when replacing the tire with new one. Thereby, the running cost of the tire pressure detection system S can be reduced.

In the present invention, since the tire sensor unit 1 is a flexible plate-like shaped member (flexible sheet), the shape of the tire sensor unit 1 can be changed in compliance with the shape of the mounting surface. Thereby, the tire sensor unit 1 can be surely attached to the mounting surface even though the shape of the mounting surface is a curved surface like a wheel.

In the present embodiment, the tire sensor unit 1 is provided at the position opposite across a rotation center of wheel 3 with respect to the air valve 3c or the position adjoining to the air valve 3c. Thus, the unbalance of the wheel 3 can be predicted If the tire sensor unit 1 is positioned adjoining to the air valve 3c provided on the rim 3a, the unbalance of the wheel 3 can be minimized by making the position of the lightest point of the tire 2 agree with the position of the air valve 3c, when the tire 2 is mounted around the wheel 3.

If the tire sensor unit 1 is provided at the position opposite across a rotation center of wheel 3 with respect to the air valve 3c, since the weight of the tire sensor unit 1 and the weight of the air valve 3c are canceled with each other, the unbalance of the wheel 3 can be minimized. Thereby, the weight of the balance weight, which is attached to the wheel for balancing the tire wheel assembly, can be minimized.

In the present invention, the tire sensor unit 1 is attached to the wheel 3 using a bonding agent or an adhesive, unlike the conventional tire sensor unit, in which sensor (sensor unit) is deposited within the tire 2. Thereby, the complicated manufacturing process for providing the sensor within the tire can be omitted. Therefore, if the wheel 3 of the present invention is adopted, the tire pressure detection system S can be easily provided.

In the present invention, since a plasticizer is not contained in a bonding agent or an adhesive, the occurrence of the corrosion of the wheel due to an adhesive can be prevented even if the wheel is used for a long time or the wheel is exposed to the condition of rapid temperature change.

Additionally, the prevention of the occurrence of the corrosion of the wheel prevents the separation of the tire sensor unit 1 from the wheel.

According to the tire pressure detection system S, the data signal D1 transmitted from the tire sensor unit 1 that includes the tire pressure data and the tire temperature data of tire 2 is received by the receiver unit 20.

Therefore, the pressure and temperature of the tire can be recognized at the position away from the tire 2.

Benefits of Tire Pressure Detection System

According to the tire pressure detection system S, since the tire sensor unit 1 is provided on the wheel 3, the tire sensor unit 1 can be used continuously without discarding the tire sensor unit 1 together with the tire when replacing the tire 2 with new one. Thereby, the running cost of the tire pressure detection system S can be reduced.

According to the tire pressure detection system S, since the tire sensor unit 1 does not require the specific power source for managing the tire sensor unit 1, the weight of the tire sensor unit 1 can be minimized. Thus, the influence due to the weight of the tire sensor unit on the unbalance of the wheel 3 can be reduced.

In the tire pressure detection system S, the carrier wave used in the keyless entry system is adopted for the transmission of the data signal D1. Thus, the new frequency domain for the transmission of the carrier wave is not required for providing the tire pressure detection system S.

Thereby, since the additional receiver unit is not required for transmitting the carrier wave of the data signal D1, the required cost for providing the tire pressure detection system S can be reduced.

According to the tire pressure detection system S, the driver of the vehicle is notified of the occurrence of the trouble of tire. This is because the warning buzzer 33 sounds a beep sound and the warning lamp 32 is turned on, if the trouble of the tire has arisen.

Modification of the Present Invention

Although there have been disclosed what are the patent embodiment of the invention, it will be understood by person skilled in the art that variations and modifications may be made thereto without departing from the scope of the invention, which is indicated by the appended claims.

In the above described embodiment, the tire sensor unit 1 is attached to the well 3b of the rim 3a using a bonding agent etc.

Figure 11A:
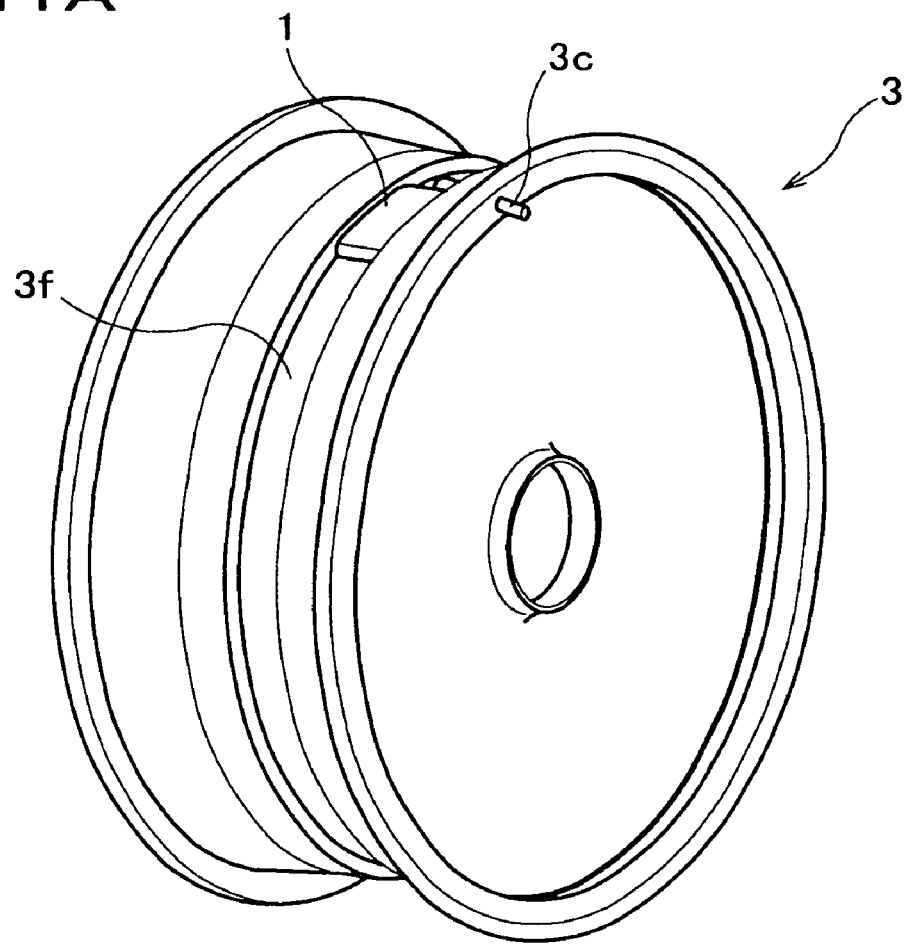
FIG. 11A is a perspective view of the wheel.
Figure 11B:
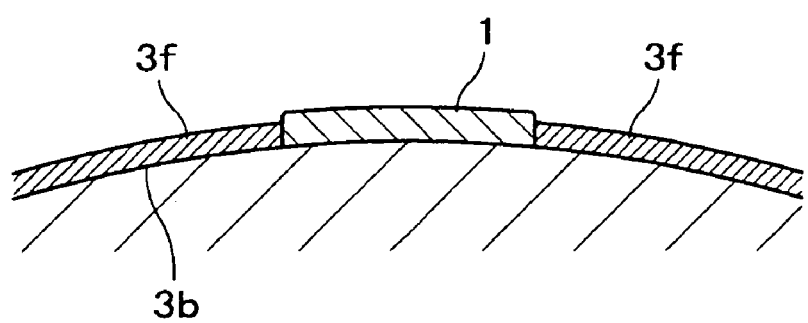
FIG. 11B is a cross-sectional view of the part of the wheel of FIG. 11A.

But, the tire sensor unit 1 may be attached to the well 3b of the wheel 3 using a rubbery belt 3f in addition to a bonding agent. As can be seen from FIG. 11A and FIG. 11B, since the rubbery belt 3f is strung around the circumference of the well 3b and both ends of the rubbery belt 3f are connected to respective longitudinal ends of the tire sensor unit 1, the tire sensor unit 1 is pushed toward the well 3b. Thus, the tire sensor unit 1 is surely attached to the well 3b of the wheel 3.

In the present invention, the tire sensor unit 1 may be attached to the well 3b of the wheel 3 using an annular rubbery belt 3f. In this case, since the annular rubbery belt 3f is strung around the circumference of the well 3b, the tire sensor unit 1 is sandwiched between the annular rubbery belt 3f and the circumference of the well 3b.

According to these methods using the rubbery belt 3f, the tire sensor unit 1 is firmly attached to the well 3b of the wheel 3.

In the tire pressure detection system S, the high frequency wave on the order of 10 to 100 kHz is used for performing the transmission between the power supply unit 40 and the power receiving unit 50. But, a micro wave whose frequency is on the order of GHz can be used instead of a high frequency wave.

Figure 13:
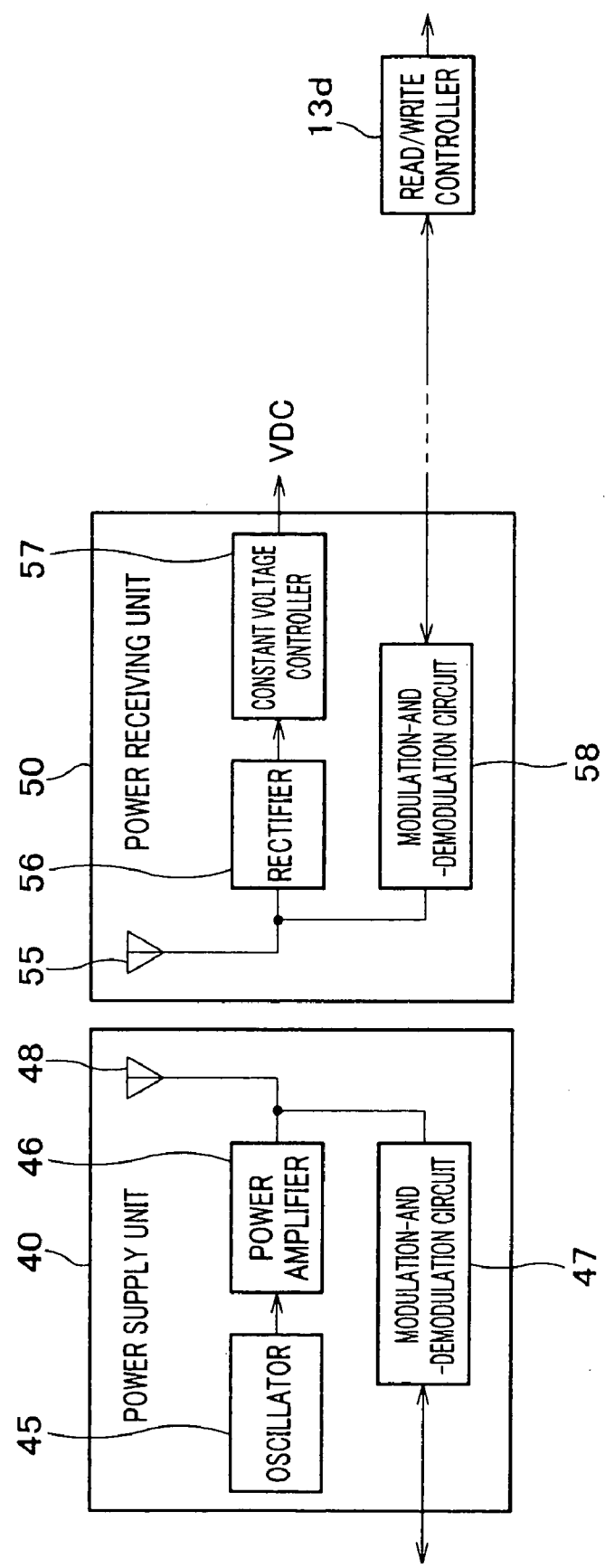
FIG. 13 is a block diagram of the power supply unit, and power receiving unit of the tire sensor unit attached to the wheel.
Figure 14:
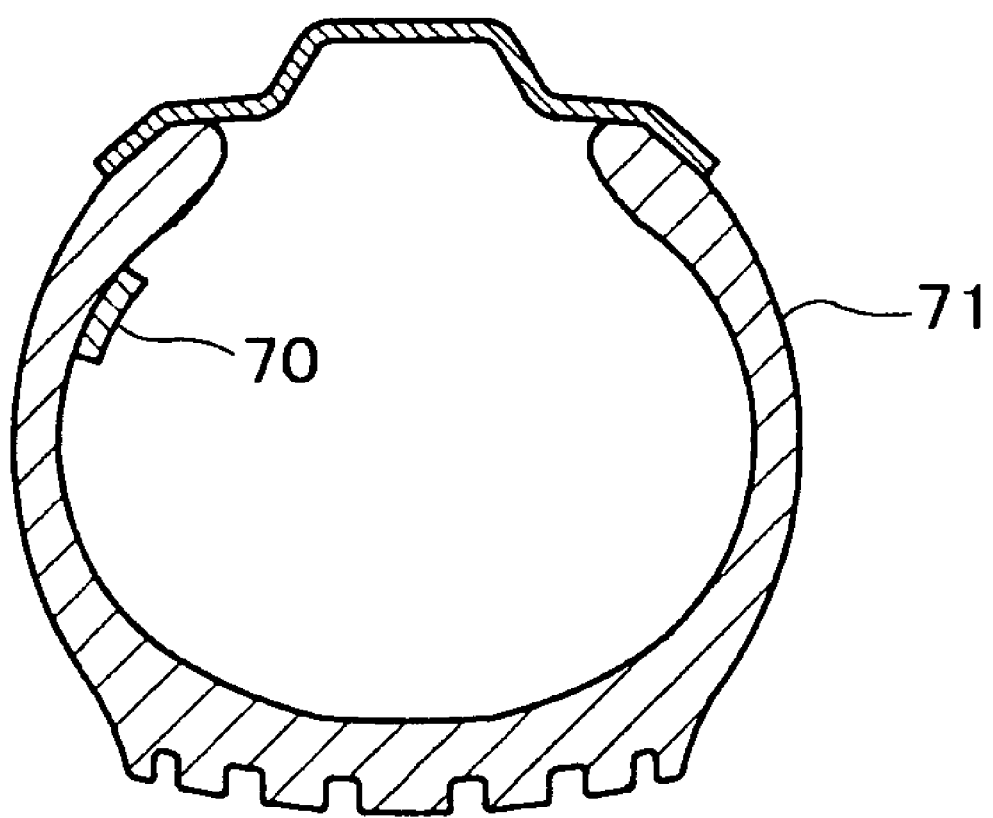
FIG. 14 is an explanatory view of the conventional tire pressure detection system.

In this case, as shown in FIG. 13, the unit, which has an oscillator 45, a power amplifier 46, and a modulation-and-demodulation circuit 47, can be used as the power supply unit 40. In this power supply unit 40, a microwave generated by the oscillator 45 is amplified by the power amplifier 46, and then transmitted through the transmission antenna 48.

Additionally, the unit composed of a rectifier 56, a constant voltage controller 57, and a modulation-and-demodulation circuit 58 can be used as the power receiving unit 50. In this power receiving unit 50, the microwave received through a receiver antenna 55 is rectified into a direct current by the rectifier 56. Then, the direct current obtained by the rectifier 56 is stabilized by the constant voltage controller 57 and is supplied to the tire sensor unit 1 as a direct current VDC of constant voltage.

In the present invention, information, such as types of tire and a model name of tire, may be stored in the identification information recorder 13c of the tire sensor unit 1.

The transmission data generator 13b may transmit the same data signal D1 several times at intervals of predetermined time period.

In this case, the receiver unit 20 can surely receive the data signal D1 even if part of data signal D1 is not received by the receiver unit 20. This is because the lacked part of the data can be complemented by the data contained in another data signal D1, which is transmitted repeatedly.

In the present embodiment, the detection of the occurrence of the trouble of the tire is performed in the tire fault detector 31 of the display unit 30. But, the tire fault detector 31 may be provided within the tire sensor unit 1.

In this case, for example, the tire fault detector 31 may be provided between the transmission data generator 13b and the radio transmitter 7.

In the present embodiment, additionally, the transmission of the transmission data can be allowed only when the tire trouble is detected.

What is claimed is:

1. A wheel provided with a tire sensor unit comprising:
   a tire sensor unit further comprising:
      a sensor which detects a pressure and a temperature of a tire, and generates a tire pressure data signal and a tire temperature data signal based on the pressure and temperature of the tire; and
      a radio transmitter which generates a data signal including the tire pressure data signal and the tire temperature data signal, and transmits the data signal by wireless, and
   an annular rubbery belt provided around a well of a rim of the wheel,
   wherein the tire sensor unit is sandwiched between the annular rubbery belt and the well and the position where the tire sensor unit is provided is the position in the vicinity of an air valve provided on the rim or the position opposite across a rotation center of the wheel with respect to the air valve, to enable the prediction of the direction of the unbalance of the wheel.

2. A wheel according to claim 1, wherein the tire sensor unit is a flexible sheet.

3. A wheel according to claim 1, wherein the tire sensor unit is attached to a well of the wheel using a bonding agent or an adhesive.

4. A wheel according to claim 3, wherein the bonding agent without a plasticizer or the adhesive without a plasticizer is used for attaching the tire sensor unit to the well.

5. A wheel according to claim 1, wherein
   the tire sensor unit includes:
   an identification information recorder holding therein a tire ID and a vehicle ID, with the tire ID being an unique identification code for identifying the wheel provided with the tire sensor unit and the vehicle ID being an unique identification code for identifying the vehicle equipped with the wheel; and
   an input/output port receiving the command signal which commands the update of the tire ID and the vehicle ID held in the identification information recorder.

6. A tire pressure detections system comprising:
   a tire sensor unit including
      a sensor which detects a pressure and a temperature of a tire, and generates a tire pressure data signal and a tire temperature data signal based on the pressure and the temperature of the tire, and
      a radio transmitter which generates a data signal including the tire pressure data signal and the tire temperature data signal, and transmits the data signal by wireless;
   a wheel having the tire sensor unit attached thereon;
   an annular rubbery belt provided around a well of a rim of the wheel and the tire sensor unit being sandwiched between the annular rubbery belt and the well; and
   a receiver unit, receiving the data signal transmitted from the radio transmitter,
   wherein the tire sensor unit is provided in a position in the vicinity of an air valve or the position opposite across a rotation center of the wheel with respect to the air valve, to enable the prediction of the direction of the unbalance of the wheel.

7. A tire pressure detection system according to claim 6, further comprising:
   a power supply mechanism, which supplies electric power for driving the tire sensor unit to the tire sensor unit in a contactless manner.

8. A tire pressure detection system according to claim 7, wherein
   a carrier frequency, used in a keyless entry system of vehicle door lock wave, is used for exchanges of the data signal between the radio transmitter and the receiver unit.

9. A tire pressure detection system according to claim 8, further comprising:
   a tire fault detector, which computes a tire pressure and tire temperature based on the data signal and compares the tire pressure and tire temperature with threshold values of the tire pressure and the tire temperature, respectively, and
   the tire fault detector raises an alarm, using at least one of a beep sound and a flash of light, in order to notify the occurrence of a trouble of the tire, when the tire pressure is below a predetermined value thereof and the tire temperature exceeds a predetermined temperature thereof.

10. A tire pressure detection system according to claim 7, further comprising:
   a tire fault detector, which computes a tire pressure and tire temperature based on the data signal and compares the tire pressure and tire temperature with threshold values of the tire pressure and the tire temperature, respectively, and the tire fault detector which raises an alarm, using at least one of a beep sound and a flash of light, in order to notify the occurrence of a trouble of the tire, when the tire pressure is below a predetermined value thereof and the tire temperature exceeds a predetermined temperature thereof.

11. A tire pressure detection system according to claim 6, wherein a carrier wave, used in a keyless entry system of vehicle door lock mechanism, is used for exchanges of the data signal between the radio transmitter and the receiver unit.

12. A tire pressure detection system according to claim 11, further comprising:

a tire fault detector, which computes a tire pressure and tire temperature based on the data signal and compares the tire pressure and tire temperature with threshold values of the tire pressure and the tire temperature, respectively, and the tire fault detector which raises an alarm, using at least one of a beep sound and a flash of light, in order to notify an occurrence of a trouble of the tire, when the tire pressure is below a predetermined value thereof and the tire temperature exceeds a predetermined temperature thereof.

13. A tire pressure detection system according to claim 6, further comprising:

a tire fault detector, which computes a tire pressure and tire temperature based on the data signal and compares the tire pressure and tire temperature with threshold values of the tire pressure and the tire temperature, respectively, and the tire fault detector which raises an alarm, using at least one of a beep sound and a flash of light, in order to notify an occurrence of a trouble of the tire, when the tire pressure is below a predetermined value thereof and the tire temperature exceeds a predetermined temperature thereof.

14. A tire pressure detection system according to claim 6, wherein the tire sensor unit includes:

an identification information recorder holding therein a tire ID and a vehicle ID, with the tire ID being an unique identification code for identifying the wheel provided with the tire sensor unit and the vehicle ID being an unique identification code for identifying the vehicle equipped with the wheel; and an input/output port receiving the command signal which commands the update of the tire ID and the vehicle ID held in the identification information recorder.

* * * * *